United States Patent Office 3,281,336
Patented Oct. 25, 1966

3,281,336
RECOVERY OF TRIOXANE FROM FORMALDEHYDE BY EXTRACTIVE DISTILLATION IN THE PRESENCE OF WATER OR AN ALKYLENE GLYCOL
Frank Truett Talbert, Bay City, Tex., assignor to Celanese Corporation of America, New York, N.Y., a corporation of Delaware
No Drawing. Filed Dec. 11, 1962, Ser. No. 243,753
5 Claims. (Cl. 203—64)

This invention relates to a process of purifying trioxane. It more particularly refers to a process whereby formaldehyde and various impurities are removed from trioxane.

It is well known that trioxane is made by the trimerization of concentrated aqueous formaldehyde catalyzed by strong acids, e.g., sulfuric. The reaction product is vapors containing trioxane, water, formaldehyde and impurities, which product can be concentrated in a stripper to produce an overhead product containing trioxane, water, formaldehyde, as well as certain light ends and heavy ends impurities.

It is an object of this invention to purify this overhead from the stripper. It is another object to remove the heavy ends impurities from the stripper overhead. Other and additional objects will become apparent from a consideration of the whole of this specification.

In accord with and fulfilling these objects, this invention includes the extractive distillation of trioxane mixed with water, formaldehyde and heavy ends impurities. The extractant is suitably water or glycols, e.g., ethylene or propylene glycols.

In the practice of this invention, the trioxane mixture to be purified is fed into an intermediate point in a distillation column and water is fed into the column at a point higher than the trioxane mixture. The desired product is taken overhead and comprises a mixture of water and trioxane. The undesirable heavy ends impurities are removed and are taken as a base stream containing substantially no trioxane but containing water and formaldehyde. Thus the water extractive distillation column is an effective way of separating the desired trioxane from the undesirable heavy ends impurities.

Unexpectedly it is found that the use of extractive distillation gives a trioxane which can be polymerized to form an oxymethylene polymer of higher molecular weight than is obtained without such extractive distillation. For example, when the extractive distillation was employed in the purification of trioxane, it was possible, under the conditions of polymerization to obtain a copolymer of trioxane and a cyclic ether, which copolymer had a melt index of 3.0 or lower but when the same trioxane was purified without using an extractive distillation, and then polymerized under the same conditions, the melt index of the copolymer was 3.5 to 25. Copolymerization of trioxane and a cyclic ether is known to the art, as illustrated in U.S. Patent No. 3,027,352.

The extractive distillation column suitably has 20 to 60 plates and operates at about 210 to 230° F. at a pressure of about 0 to 5 p.s.i.g. The weight ratio of the water feed (above the point where the trioxane-containing stream enters the column) to the trioxane-formaldehyde-water feed is desirably in the range of about 0.5:1 to 1:1, while the ratio of total water feed to trioxane feed is desirably in the range of about 1:1 to 1.5:1. It is preferred to utilize a column having 40 plates, operating at a reflux ratio of 3:1 and a base temperature of 218 to 220° F. at 3 p.s.i.g. The feed rate is of course dependent upon the column size but generally it has been found suitable to process about 1400 parts by weight per hour of trioxane mixture with a water feed of 2150 parts by weight per hour. The overhead trioxane-water product usually contains about 50 to 60% of trioxane.

It is to be understood that the foregoing detailed description is given merely by way of illustration and that many variations may be made therein without departing from the spirit of the invention.

Having described my invention, what I desire to secure by Letters Patent is:

1. A process for the purification of trioxane containing water, formaldehyde and heavy end impurities which comprises subjecting said impure trioxane to a continuous extractive distillation employing as an extractant a compound selected from the group consisting of water and alkylene glycols by continuously introducing the impure trioxane into a distillation column, continuously introducing the extractant into the column at a point on the column above the point of introduction of the impure trioxane to establish an extractive distillation zone, the amount of extractant introduced into the column being sufficient to effect extractive distillation of the impure trioxane, and continuously taking off as a distillate, aqueous trioxane.

2. Process as set forth in claim 1 wherein the extractant is water and the weight ratio of water to trioxane ranges from about 1:1 to 1.5:1.

3. Process according to claim 2 wherein the extractive distillation is carried out at about 210 to 230° F. and about 0 to 5 p.s.i.g. in a column having 20 to 60 plates.

4. A process for the purification of trioxane containing water, formaldehyde and heavy end impurities, the trioxane polymerizable with a cyclic ether to form a high molecular oxymethylene copolymer having a melt index of about 3.0 or less which comprises subjecting the impure trioxane to a continuous extractive distillation employing water as an extractant by continuously introducing the impure trioxane into a distillation column, continuously introducing water into the column above the point of introduction of the impure trioxane to establish an extractive distillation zone in the column between the points, the amount of water introduced into the column being sufficient to effect extractive distillation of the impure trioxane, and continuously taking off as a distillate aqueous trioxane.

5. Process according to claim 4 wherein the weight ratio of water to trioxane ranges from about 1:1 to 1.5:1.

References Cited by the Examiner

UNITED STATES PATENTS

| 2,347,447 | 4/1944 | Walker | 260—340 |
|---|---|---|---|
| 2,551,593 | 5/1951 | Gilliland et al. | 203—83 |
| 2,681,306 | 6/1954 | Kemp et al. | 203—96 |

OTHER REFERENCES

Brown et al., Unit Operations, published 1950, New York, pages 393 and 394.

Perry, Chemical Engineer's Handbook, 3d ed., pages 634 and 655 (1950).

NORMAN YUDKOFF, Primary Examiner.

NATHANIEL S. RIZZO, WILBUR L. BASCOMB, D. M. KERR, Assistant Examiners.